United States Patent [19]

Burns et al.

[11] Patent Number: 5,395,863
[45] Date of Patent: Mar. 7, 1995

[54] RADIATION-CURABLE INK COMPOSITIONS COMPRISING A SOLID N-VINYL MONOMER

[75] Inventors: Kevin G. Burns; Helen Jezequel, both of Margate; Nigel P. Gould, Broadstairs, all of England

[73] Assignee: Sericol Limited, Kent, England

[21] Appl. No.: 14,566

[22] Filed: Feb. 8, 1993

[30] Foreign Application Priority Data

Feb. 7, 1992 [GB] United Kingdom ............... 9202554

[51] Int. Cl.⁶ .................. C09D 11/10; C08F 2/48; C08K 3/10
[52] U.S. Cl. ........................... 522/71; 522/81; 522/96; 522/103; 524/560; 106/20 R; 106/20 B
[58] Field of Search ............ 522/96, 71, 81, 75, 522/103; 524/560

[56] References Cited

U.S. PATENT DOCUMENTS

| | | | |
|---|---|---|---|
| 4,415,468 | 11/1983 | Chen et al. | 252/182 |
| 4,434,035 | 2/1984 | Eichler et al. | 522/81 |
| 4,994,347 | 2/1991 | Smothers | 430/282 |
| 5,134,175 | 7/1992 | Lucey | 522/81 |

FOREIGN PATENT DOCUMENTS

| | | | |
|---|---|---|---|
| 0175562 | 3/1986 | European Pat. Off. | C09J 3/14 |
| 0324481 | 7/1989 | European Pat. Off. | G03G 1/68 |
| 0357204 | 3/1990 | European Pat. Off. | C09J 133/08 |
| 3109809 | 9/1982 | Germany | G03F 7/26 |
| 002123388 | 5/1990 | Japan | C03F 7/03 |
| 1407069 | 9/1975 | United Kingdom . | |
| 1508306 | 4/1978 | United Kingdom | G03G 9/10 |

*Primary Examiner*—Susan W. Berman
*Attorney, Agent, or Firm*—Bacon & Thomas

[57] ABSTRACT

Radiation-curable compositions including a free radically polymerizable monomer or prepolymer and a different monomer containing an N-vinyl group, said different monomer being a solid at ambient temperature. The different monomer is preferably N-vinyl caprolactam, N-vinyl carbazole, or N,N'-divinyl-2-imidazolidone, for example in an amount of from 1 to 50 percent by weight of the said different monomer. Such compositions have shown good adhesion to and have rendered plastics substrates wettable by the compositions before curing, without the presence of N-vinyl-2-pyrrolidone.

10 Claims, No Drawings

RADIATION-CURABLE INK COMPOSITIONS COMPRISING A SOLID N-VINYL MONOMER

BACKGROUND OF THE INVENTION

1. Technical Field of the Invention

This invention concerns radiation-curable compositions, for example radiation-curable screen printing inks.

2. Description of the Prior Art

Hitherto proposed screen printing inks frequently include N-vinyl-2-pyrrolidone, especially when the inks are to be printed on to polymeric substrates. Indeed, N-vinyl-2-pyrrolidone has for a number of years been a key component of many ultraviolet light curable inks due to its inherent properties, for example acting as a diluent for viscous oligomers in such inks, and as a reactive monomer which cures with the ink. In practice, N-vinyl-2-pyrrolidone has been found to give a better reduction in ink viscosity than many acrylate monomers, for example phenoxyethyl acrylate, and tri-propylene glycol diacrylate.

In addition to acting as a curable monomer and a viscosity reducing agent, the polarity of N-vinyl-2-pyrrolidone has been used to enhance the wetting characteristics of inks when they are to be applied to plastics substrates, and its solvent power has contributed to the adhesion of these inks to such substrates.

These various properties of N-vinyl-2-pyrrolidone have led to its being used widely in screen printing inks.

Screen printable, radiation curable inks frequently include components with acrylate functionality because the double bond of the acrylate group is highly reactive in free radically initiated polymerization reactions. Although the vinyl functionality of N-vinyl-2-pyrrolidone is also reactive in free radically initiated polymerization reactions, it is generally slower to react than are acrylate groups.

Typically, radiation curable inks contain from 5 to 35 percent by weight of N-vinyl-2-pyrrolidone, such amounts usually giving the inks commercially acceptable adhesion, viscosity, wetting and curing/drying times. However, the presence of pigments in the inks can inhibit penetration of the curing radiation into the inks so that curing is not complete, leading to uncured components including acrylate and vinyl groups remaining in the ostensibly cured inks. Furthermore, uncured N-vinyl-2-pyrrolidone almost inevitably remains in view of the relative reactivities of acrylate and vinyl groups in the polymerization reaction.

Residual N-vinyl-2-pyrrolidone represents a major disadvantage for inks containing it, especially when, as often happens, printed polymer sheets are stored in a stack after printing and curing, or a roll of printed polymer is wound up and stored following printing and curing. The "dry" ink is then held in storage against the reverse side of another sheet or against the reverse of the web in the roll, and this can be under considerable pressure. This frequently leads to blocking of the sheets to each other or within the roll, and perhaps to the possibly less severe effect of marking or etching of the non-printed side of the polymer sheet or web where contact with the ink has occurred. These effects are the result of the relatively high volatility of N-vinyl-2-pyrrolidone and its solvent power. However, even slight marking of an expensive plastics sheet can be disadvantageous.

In some instances, these problems can be reduced by the use of the finest and/or semi-calendered screen meshes which give thinner ink deposits which cure more completely than ink deposits printed using coarser meshes. However, the problem often persists even when such meshes are used. An alternative technique would be to increase the duration of the cure, but this is not always commercially acceptable. Furthermore, if a print feels dry and has the desired adhesion to the printed substrate, the necessity for more fully curing the print is not obvious. For example, an opaque black ink printed on a plastics sheet and cured using low powered radiation might feel dry, and have acquired the necessary adhesion, but unreacted N-vinyl-2-pyrrolidone could in some circumstances damage a plastics sheet in contact with the ink.

Although the problem of residual unreacted N-vinyl-2-pyrrolidone is particularly acute with radiation-curable inks due to the screening effect of the pigment in the inks, the lower reactivity of N-vinyl-2-pyrrolidone compared with that of other free radically polymerizable components in radiation-curable compositions also leads to such residues.

SUMMARY OF THE INVENTION

According to the present invention there is provided a radiation-curable composition comprising a free radically polymerizable monomer or prepolymer and a different monomer containing an N-vinyl group, said different monomer being a solid at ambient temperature.

DETAILED DESCRIPTION OF THE PREFERRED EMBODIMENTS

In general, compositions in accordance with the present invention should not include N-vinyl-2-pyrrolidone, and it is considered surprising that monomers containing an N-vinyl group which are solid at ambient temperature have the ability to reduce the viscosity of compositions in which they are present whilst imparting good adhesion and rendering plastics substrates wettable by the compositions before the compositions are cured. Compositions in accordance with the present invention have also been "dried" at commercially acceptable rates.

The melting point of the monomer containing an N-vinyl group which is used in accordance with the present invention should be above ambient temperature. Specific monomers which can be used for the purpose include N-vinyl caprolactam (m.p. 34° C.), N-vinylcarbazole (m.p. 63° C.), and divinyl ethylene urea (N,N'-divinyl-2-imidazolidone - m.p. 66° C). N-vinyl caprolactam is particularly preferred, and it has not been found to cause damage to plastics substrates contacting the compositions following curing.

It should be appreciated that the said different monomers contining an N-vinyl group cannot in general be substituted directly for N-vinyl-2-pyrrolidone in hitherto proposed radiation-curable compositions as it tends to change the performance of the compositions. However, minor adjustments to the compositions are usually all that are required.

The present invention has been found to be of particular value in producing radiation-curable inks which do not contain residues of N-vinyl-2-pyrrolidone following curing. Inks in accordance with the present invention can be substantially similar to hitherto proposed radiation-curable inks, depending upon the intended end use.

Compositions in accordance with the present invention include a radiation-curable monomer or prepolymer other than the N-vinyl monomer, for example an acrylate prepolymer selected from aliphatic or aromatic urethane, epoxy or polyester acrylates, or other acrylate prepolymers. The term prepolymer is used herein to refer to materials which are also referred to in the art as oligomers. Furthermore, although specific reference is made herein to acrylates, the term acrylate is used herein to include materials having acrylic functionality and therefore to include acrylates and methacrylates.

Alternatively, and/or additionally, compositions in accordance with the invention can include polymers containing units derived from one or more ethylenically unsaturated monomers, for example alkyl acrylates and methacrylates, e.g. ethyl acrylate, methyl methacrylate or butyl methacrylate.

Compositions in accordance with the present invention can include one or more acrylate monomers, including straight and branched chain alkyl acrylates, for example iso-bornyl acrylate, iso-decyl acrylate, octadecyl acrylate, lauryl acrylate, stearyl acrylate and hexanediol diacrylate; polyether diacrylates, for example polyethylene glycol diacrylates (e.g. with four ethyleneoxy groups), e.g. alkyleneoxy diacrylates, e.g. tri-ethylene glycol diacrylate, tri-propylene glycol diacrylate and propoxylated neo-pentyl glycol diacrylate; and acrylates of triols and alkoxy extended triols, for example tri-methylol propane triacrylate, and ethoxylated trimethylol propane triacrylate.

Compositions in accordance with the present invention will usually contain from 1 to 50, and preferably 3 to 40, percent by weight of the N-vinyl group-containing monomer. In practice, compositions in accordance with the present invention can be formulated as two components which are mixed before use, one component containing ingredients of the composition other than the N-vinyl group-containing compound and the other component containing the N-vinyl group-containing compound, for example in the form of a thinner, e.g. in admixture with a solvent for the N-vinyl group-containing compound. Examples of solvents which can be used for such thinners include acrylate monomers referred to above. The thinner can then serve to provide the compositions with the desired viscosity.

Compositions in accordance with the present invention are radiation-curable and they should include a photoinitiator when they are to be cured by exposure to ultraviolet light. A wide variety of photoinitiators can be used, for example benzophenones, benzoin, benzoin ethyl ether, benzion methyl ether, acyl phosphine oxides, and thioxanthone derivatives. Compositions in accordance with the present invention can also include a photo accelerator to increase the rate of photo-polymerization, for example ethyl 4-(dimethylamino)benzoate, methyldiethanolamine, 2-(n-butoxy)ethyl 4-(dimethylamino) benzoate or an acrylated amine, e.g. Ebecryl P115 (Trade Mark).

Compositions in accordance with the present invention can also include other materials which have hitherto been included in photocurable compositions. Inks, for example, can include one or more pigments, extenders, fillers, flow agents, slip additives, anti-marr agents or stabilizers, depending upon the desired properties of the compositions. It will, however, be appreciated that compositions in accordance with the present invention can be formulated for other end uses than as inks, for example as radiation-curable varnishes.

The following Examples are given by way of illustration only. All parts are by weight, based on the total weight of the final ink compositions.

EXAMPLE 1

The following components were mixed in known manner to form a photocurable ink composition:

| aliphatic urethane acrylate | 35 |
|---|---|
| carbon black pigment | 5 |
| tripropylene glycol diacrylate | 22 |
| ethoxylated trimethylol propane triacrylate | 15 |
| N-vinyl caprolactam | 15 |
| iso-propyl thioxanthone | 2 |
| methyl diethanolamine | 4 |
| silicone oil flow agent | 2 |

This ink was then used to effect screen printing using a standard screen printing mesh on to a polyvinyl chloride sheet. The printed ink was cured using one 80 W/cm medium pressure mercury lamp.

A number of these printed sheets were then stacked on top of each other for a period of 24 hours following which the sheets were separated and inspected for signs of damage. Blocking between the sheets was low, and the sheets did not show any signs of damage.

EXAMPLE 2

The following components were mixed in known manner to form a photocurable ink composition:

| Bisphenol A based epoxy acrylate | 50 |
|---|---|
| phenoxyethyl acrylate | 5 |
| tripropylene glycol diacrylate | 10 |
| Pigment Red 2 | 6 |
| silicone oil flow agent | 2 |
| 2,2-diethoxy acetophenone | 5 |
| 1-hydroxycyclohexyl acetophenone | 7 |
| N-vinyl caprolactam | 10 |
| amine acrylate (Ebecryl P115) | 5 |

This ink was then used to effect screen printing using a standard screen printing mesh on to a polycarbonate sheet. The printed ink was cured using one 80W/cm medium pressure mercury lamp.

As in Example 1, blocking between the sheets was low and the sheets were not damaged as a result of the storage.

EXAMPLE 3 (comparison)

The following components were mixed in known manner to form a photocurable ink composition:

| aliphatic urethane acrylate | 45 |
|---|---|
| carbon black pigment | 5 |
| tripropylene glycol diacrylate | 17 |
| propoxylated glycerol triacrylate | 10 |
| N-vinyl pyrrolidone | 15 |
| ethyl 4-(dimethylamino)benzoate | 4 |
| iso-propyl thioxanthone | 2 |
| silicone oil flow agent | 2 |

This ink was then used to effect screen printing using a standard screen printing mesh on to a polyvinyl chloride sheet. The printed ink was cured using one 80W/cm medium pressure mercury lamp.

This ink after curing caused marking/etching of the polyvinyl chloride sheets where contact had occurred. Blocking was also observed between the sheets.

We claim:

1. A radiation-curable ink composition comprising a free radically polymerizable (meth)acrylate monomer, an acrylate-functional prepolymer, a different monomer containing an N-vinyl group which is a solid at ambient temperature, and a pigment.

2. A composition according to claim 1, wherein the said different monomer is a member selected from the group consisting of N-vinyl caprolactam, N-vinyl carbazole, or N,N'-divinyl-2-imidazolidone.

3. A composition according to claim 1, including from 1 to 50 percent by weight of the said different monomer.

4. A composition according to claim 1, including from 3 to 40 percent by weight of the said different monomer.

5. A composition according to claim 1, wherein the prepolymer is a member selected from the group consisting of a urethane acrylate, an epoxy acrylate, a polyester acrylate or a polyether acrylate.

6. A composition according to claim 1, wherein the said at least acrylate or methacrylate monomer is a member selected from the group consisting of tripropylene glycol diacrylate, a trimethylol propane alkoxylate triacrylate, ditrimethylol propane tetra-acrylate or phenoxyethyl acrylate.

7. A composition according to claim 1, including a photoinitiator.

8. A composition according to claim 1, including a polymer made by the addition polymerization of at least one ethylenically unsaturated monomer.

9. The composition of claim 8 wherein said polymer is poly(alkyl acrylate) or poly(alkyl methacrylate).

10. A composition according to claim 1, including an extender.

* * * * *